United States Patent
Hotchkies et al.

(10) Patent No.: US 8,577,879 B1
(45) Date of Patent: Nov. 5, 2013

(54) NAVIGATIONAL AIDS WITHIN ITEM SEARCH RESULTS

(75) Inventors: Blair L. Hotchkies, Bellevue, WA (US); Daniel R. Parshall, Redmond, WA (US); Jason P. Patrikios, Seattle, WA (US); Brent Robert Mills, Seattle, WA (US); Dan Catalin Teodorescu, Shoreline, WA (US); Jennica Jane Pounds, Bothell, WA (US); Paul Daniel Jaye, Seattle, WA (US); Kaigene Jennifer Lin, Issaquah, WA (US); David Aaron Lichterman, Seattle, WA (US); Luis Alejandro Acosta, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 757 days.

(21) Appl. No.: 12/608,581

(22) Filed: Oct. 29, 2009

(51) Int. Cl.
*G06F 17/00* (2006.01)

(52) U.S. Cl.
USPC ............ 707/732; 707/768; 707/706; 707/751

(58) Field of Classification Search
USPC .................................................. 707/767, 768
See application file for complete search history.

(56) References Cited

U.S. PATENT DOCUMENTS

| | | |
|---|---|---|
| 2003/0195877 A1* | 10/2003 | Ford et al. ........................ 707/3 |
| 2006/0259467 A1* | 11/2006 | Westphal .......................... 707/3 |
| 2008/0109481 A1* | 5/2008 | Catanzariti et al. ........ 707/104.1 |
| 2010/0153427 A1* | 6/2010 | Schechter et al. ............ 707/768 |

* cited by examiner

*Primary Examiner* — Belix M Ortiz Ditren
(74) *Attorney, Agent, or Firm* — Thomas | Horstemeyer, LLP

(57) ABSTRACT

Disclosed are various embodiments providing navigational aids within item search results. A pool of items is generated in a computing resource in response to a search query and a search context. At least one network page is encoded for rendering by a client. The at least one network page includes a ranked list of at least a portion of the items. The ranked list includes a navigational aid when a relevance score associated with the navigational aid meets a threshold. The relevance score is computed relative to respective relevance scores associated with items in the ranked list. The navigational aid has at least a same prominence within the ranked list as an item.

26 Claims, 5 Drawing Sheets

NAVIGATIONAL AIDS WITHIN ITEM SEARCH RESULTS

BACKGROUND

Product search engines are valuable tools for online shoppers looking to purchase a product. A user may enter the name of the product, and the product search engine will return a list of products that most closely match the entered name. Typically, the list of products includes a short description of each product including a title, an image, a price, and/or other information. The user may then select a link associated with a search result to order the product or find out more information about the product.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
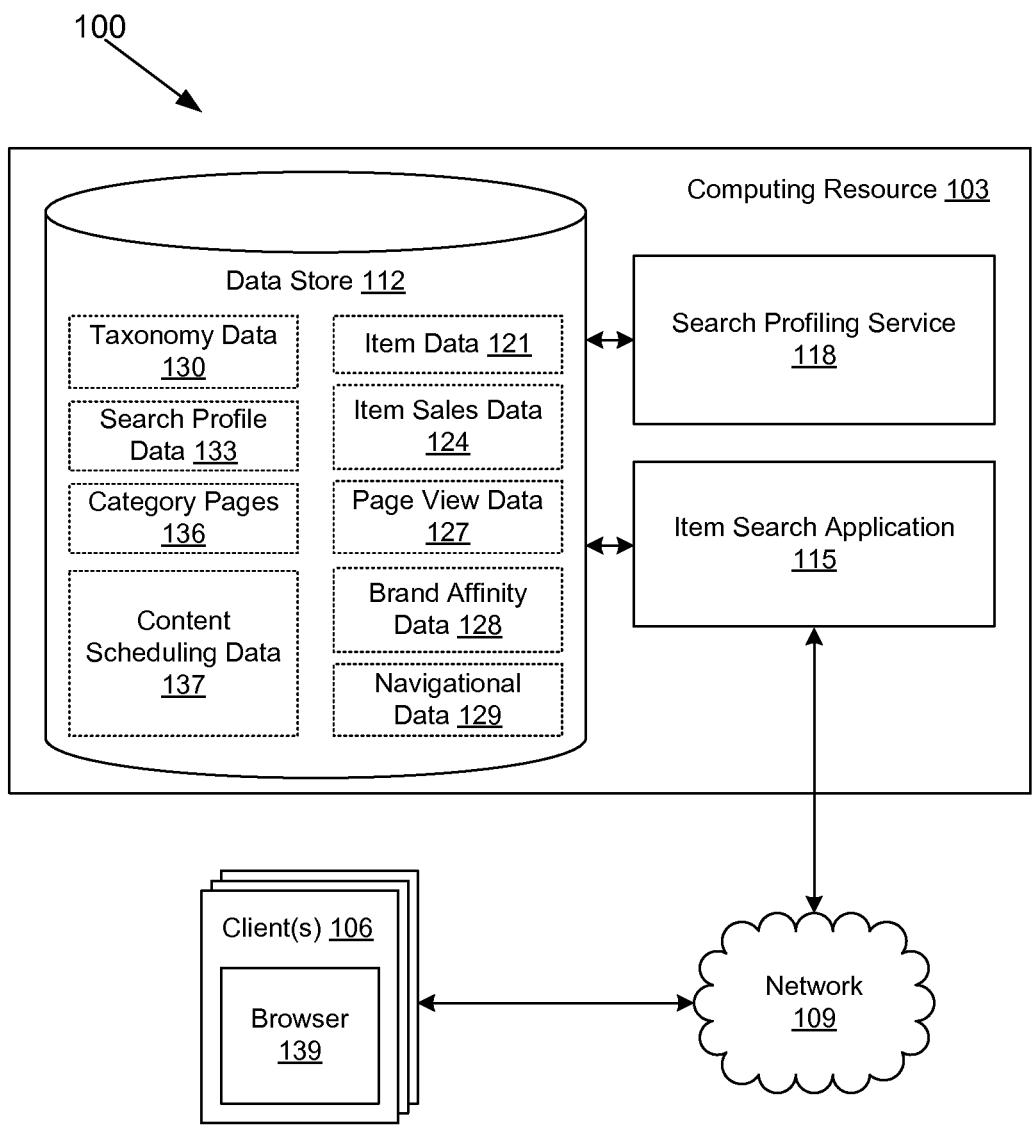
FIG. 1 is a drawing of a networked environment according to various embodiments of the present disclosure.

The present disclosure relates to providing navigational aids within item search results. An item search engine provides an online interface for locating desired items. Items may include, for example, products, services, advertisements, network pages, social networking profiles, digital content items, and/or other items. In some cases, an item search engine may be directed toward locating only buyable items.

An item search engine typically operates as follows: a user provides one or more keywords, or a search query, to the item search engine, for example, by filling out a form within a network page. The search query is conceived by the user as describing, or relating to, one or more items for which the user is searching. In response to the search query, the item search engine returns a list of items to the user. The list of items may be rendered, for example, within a network page. Often, the items within the list of items are sequenced in a ranked order, where the ranking is performed based upon relevance and/or other factors.

However, users often search for kinds of items rather than the items themselves when using an item search engine. When users have low domain knowledge, their search queries typically include very broad terms such as, for example, "books," "cameras," "music," "help," and/or other broad terms. The item search results produced from such an item search may be ultimately unhelpful to the users. As a non-limiting example, the search query "books" may produce a list of items having the word "books" in their respective item titles. In such a case, a user may prefer to navigate a taxonomy of the items within the category of books. With a taxonomy-based navigational aid, the user may select from various sub-categories within the books category, such as various genres of books, fiction books, non-fiction books, etc.

Currently, item search engines may not provide an authoritative browsing experience to users. As a non-limiting example, a user may be visiting a network site operated by an online retailer. Such a user may want to access a help function on the network site. To this end, the user may enter the search query "help" within an item search engine text region and submit the query. However, the item search engine may be configured only to search products for sale from the online retailer. Therefore, the user may be presented with, for example, a music album titled "Help," a book titled "Help Desk Management," and/or other buyable products. Such search results may frustrate users, who may then be left to navigate a site map or other network pages manually.

By contrast, the embodiments disclosed herein provide an authoritative browsing experience by embedding navigational aids within the item search results. Such navigational aids may comprise, for example, navigational aids corresponding to category network pages associated with search queries, navigational aids corresponding to nodes (or categories) within a taxonomy of items, and/or other navigational aids. Rather than rendering the navigational aids inconspicuously above, to the side of, or below the item search results on a network page, the embodiments described herein instead embed the navigational aids within the list of items comprising the item search results.

When using an item search engine, users typically focus on the list of items provided on the network page containing the item search results. Accordingly, the embodiments disclosed herein advantageously provide one or more navigational aids within the list of items. The navigational aids may have a similar appearance and visual prominence as the items rendered within the list of items. As a non-limiting example, when a user searches for "help" using the item search engine of an online retailer, a navigational aid, including several links to help-related areas of the network site that may not be buyable items (e.g., tutorials, customer service pages, etc.), may be provided within the item search results. In the following discussion, a general description of the system and its components is provided, followed by a discussion of the operation of the same.

With reference to FIG. 1, shown is a networked environment 100 according to various embodiments. The networked environment 100 includes a computing resource 103 that is in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing resource 103 may comprise, for example, a server computer or any other computing device or system providing computing resources. The computing resource 103 may represent multiple computer systems arranged, for example, in one or more server banks or other arrangements. To this end, the computing resource 103 may comprise, for example, a cloud computing resource, a grid computing resource, and/or any other distributed computing arrangement. Such computer systems may be located in a single installation or may be dispersed among many different geographical locations. In one embodiment, the computing resource 103 represents a virtualized computer system executing on one or more physical computing systems. For purposes of convenience, the computing resource 103 is referred to herein in the singular. However, in one embodiment, the computing resource 103 represents a plurality of computer systems arranged as described above.

Various applications and/or other functionality may be executed in the computing resource 103 according to various embodiments. Also, various data is stored in a data store 112 that is accessible to the computing resource 103. The data store 112 may be representative of a plurality of data stores as can be appreciated. The data stored in the data store 112, for example, is associated with the operation of the various applications and/or functional entities described below.

The components executed on the computing resource 103 may include, for example, an item search application 115, a search profiling service 118, and/or other applications, services, processes, systems, engines, or functionality not discussed in detail herein. The item search application 115 may be executed to encode for rendering by the client 106 at least one network page including a ranked list of at least a portion of a pool of items generated in response to a search query and a search context, where the ranked list includes a navigational aid. The search profiling service 118 may be executed to generate search profiling information from various data sources. In various embodiments, the item search application 115 and the search profiling service 118 may comprise a single application or any number of other applications.

The data stored in the data store 112 may include, for example, item data 121, item sales data 124, page view data 127, brand affinity data 128, navigational data 129, taxonomy data 130, search profile data 133, category pages 136, content scheduling data 137, and/or potentially other data. The item data 121 may include, for example, item titles, item images, item descriptions, item prices, item quantities, item reviews, item categories, related items, accessory items, compatible parts for that item, and/or any other data that may be used to describe or otherwise relate to items that are searchable by the item search application 115. The item sales data 124 may include data describing the quantity of sales of particular items. In some embodiments, item sales data 124 may include actual customer order data. In other embodiments, item sales data 124 may indicate a number of item sales aggregated from many customer orders.

Page view data 127 describes a quantity of page views associated with network pages that describe particular items. Such network pages may include, for example, item description pages, category pages 136 that include descriptions or listings of items, and/or any other network pages that can be associated with particular items. In some embodiments, page view data 127 may include statistics generated from network page server log data that directly indicate the number of page views associated with each respective item. In other embodiments, page view data 127 may include the actual log data generated by the network page server application, which may comprise the item search application 115.

Brand affinity data 128 may comprise data specifying the affinity of customers toward a specific brand. For example, Brand X may have a strong brand affinity, and it is likely that users providing a search query related to "Brand X" are seeking items produced by Brand X. Conversely, Brand Y may have a weak brand affinity, and it is likely that users providing a search query related to "Brand Y" are seeking items similar to items produced by Brand Y, including items that may be produced by Brand Y and other sources.

Navigational data 129 may comprise data describing network pages and features available on a network site hosting the item search application 115. Such network pages may include, for example, help pages, shipment tracking pages, customer service pages, return policy pages, feedback pages, site map pages, wish list pages, etc.

Taxonomy data 130 may comprise data describing one or more logical taxonomies for categorizing items. Each taxonomy described in taxonomy data 130 may be characterized, for example, by a hierarchical data structure such as a tree. Thus, a taxonomy may be said to have a plurality of nodes, wherein each node may link to a plurality of child nodes, each of which may in turn link to further child nodes. A starting point in a taxonomy may be called a root node, while nodes having no child nodes are said to be leaf nodes. Child nodes, grandchild nodes, etc. of a root node may also be called descendants of the root node. Each node described within taxonomy data 130 may be thought of as a category of items that relate to one another in a predefined way. Each successive child node may more specifically define a relationship among items.

As a non-limiting example, a root node of a taxonomy in taxonomy data 130 may describe all departments of an online retailer, for example, books, digital downloads, electronics, and other departments. Each of the departments, or nodes, is associated with a plurality of items. A node associated with digital downloads in the taxonomy may be associated with child nodes including, for example, video downloads, MP3 downloads, game downloads, and/or other digital downloads. Each of these child nodes, or categories, may be further subdivided if necessary. For example, the MP3 downloads category node may be further subdivided by genre, such as classical, alternative rock, country, hip-hop, and so on. Ultimately, a node, or category, is associated with one or more items. It is further understood that an item may be associated with a plurality of categories and/or a plurality of taxonomies as desired.

Search profile data 133 may include various information that describes past user behavior with respect to searching and/or browsing for items. For example, search profile data 133 may indicate the network pages and/or search queries associated with customer orders of one or more items. Such information may be aggregated and indexed for each particular item. Search profile data 133 may be generated, for example, by a search profiling service 118 or another application. Search profile data 133 may be generated, for example, from a plurality of previous search queries, page view data 127, item sales data 124, brand affinity data 128, navigational data 129, and/or other data.

Search profile data 133 may include historical relevance data for particular items connected with particular search queries and/or search contexts. As a non-limiting example, an item search using a particular search query and/or search context may return a list of items. When users select an item from the list of items, that item may be deemed more relevant for that particular search query and/or search context than the other items, notwithstanding any other relevance score associated with a ranking of the list. When users take a further action (e.g., ordering the item, viewing a network page associated with the item, ordering a related item, etc.), the item may be considered relatively more relevant. Additionally, the historical relevance data within the search profile data 133 may be normalized with respect to the ranking of the item. As a non-limiting example, when many users order an item that has a relatively low ranking, the item may be more relevant than an item with as many orders but ranked at the top of the list.

Category pages 136 include data that describes network pages that are associated with categories of items. Such network pages may be statically created or dynamically generated. Thus, in various embodiments, category pages 136 may include only elements of network pages that are to be used in the dynamic generation of network pages by a network page server application or other application. In contrast to network pages with search results that have been generated by the item search application 115, category pages 136 may be designed to provide additional information about items associated with a category, where the category may not be obtained easily upon an item search. Further, category pages 136 may include additional information about the respective category obtained, in some cases, from external data stores or sources. Category pages 136 may also include the data relating to popular or favorite items in the associated category. Such items may be, for example, distinct from the items in a pool of items generated as search results.

Content scheduling data 137 includes data that describes times and/or conditions for a navigational aid to be inserted into item search results. As a non-limiting example, content scheduling data 137 may provide one or more time periods for navigational aid insertion. In some embodiments, content scheduling data 137 may be used to manually map search queries to navigational aids so that, for example, a particular navigational aid is displayed when a particular search query is provided during a valid time period.

The client 106 is representative of a plurality of client devices that may be coupled to the network 109. The client 106 may comprise, for example, a processor-based system such as computer system. Such a computer system may be embodied in the form of a desktop computer, a laptop computer, a personal digital assistant, a cellular telephone, set-top box, music players, web pads, tablet computer systems, or other devices with like capability.

The client 106 may be configured to execute various applications such as a browser 139 and/or other applications. The browser 139 may be executed in a client 106, for example, to access and render network pages, such as web pages, or other network content served up by the computing resource 103 and/or other servers. The client 106 may be configured to execute applications beyond browser 139 such as, for example, email applications, instant message applications, and/or other applications.

Next, a general description of the operation of the various components of the networked environment 100 is provided. To begin, the search profiling service 118 may be executed periodically, or in response to some other trigger, in order to generate search profile data 133, including historical relevance data, item popularity data, and/or other data. The search profiling service 118 may generate item popularity data from information including page view data 127, item sales data 124, and/or other data. The search profiling service 118 may generate historical relevance data from information including an association from at least one search term and item popularity data. It is understood that the data generation and analysis functions of the search profiling service 118 may be implemented within the item search application 115 or some other application.

A user at a client 106 may access a network page from the item search application 115 on the computing resource 103. It is understood that the network page may be provided instead by some other network page server application executing on the computing resource 103. The network page may include a form for inputting a search query from the user to the item search application 115. To this end, the browser 139 may render, for example, a type of form input field (text, text area, etc.), a search button, and or other form components. The user may input the search query into the input field in the network page rendered by the browser 139 and then submit the search query to the item search application 115. In one embodiment, the submission of a search query may be performed, for example, by the user clicking on a link in a network page rendered by the browser 139. Such an action may select, for example, a predefined search query.

Thus, a search query is provided by a user from the client 106 to the item search application 115. In response to the search query, the item search application 115 generates a pool of items. The pool of items may be selected from the items described in item data 121 based, for example, on a keyword matching of terms in the search query with keywords that form a title of an item. Such a text matching may be performed against the categories associated with the item, descriptions associated with the item, and/or any other item data 121 associated with the item.

Furthermore, the pool of items may be generated based on a search context associated with the search query. The search context may comprise, for example, a category of items associated with the network page through which the search query was submitted by the user. As a non-limiting example, if the user visits a network page associated with books and enters the search query on such a network page, a search context of books would be used by the item search application 115 to generate the pool of items. It is understood that the search context may involve data associated with the user, such as cookies, past orders, browsing preferences, searching preferences, and any other data associated with the user that may indicate a search context. Thus, a search context may be explicitly or implicitly provided by the user. In some embodiments, there may be a default search context used when no search context is provided by the user.

Next, the item search application 115 may provide a navigational aid in response to the search query and/or search context. Where the item search results may otherwise relate to buyable items or products, the navigational aid may be a non-buyable item. The navigational aid may comprise, for example, a plurality of links to network pages associated with items and/or categories. The links may allow a user to place an order for a particular item by clicking on the link. In some embodiments, when a user clicks on one of the links, an associated item will be added to a shopping cart of the user. In some embodiments, the links may be other types of network pages associated with the search query, such as network pages implementing a customer service function.

In some embodiments, links to items that are logically related to the search query may be included in the navigational aid. Such logically related items may include, for example, parts, accessories, similar items, etc. As a non-limiting example, when a user searches for a type of ink-jet printer, the links in the navigational aid may relate to inks that are compatible with that printer. As another non-limiting example, when a user searches for "1957 Chevy," the links may relate to mufflers or other parts that are compatible with a 1957 Chevy.

The navigational aid may also include a title, description, one or more images, and/or other features. It is noted that the links within a navigational aid may lead to network pages associated with particular items, network pages with categories of items, etc. In some embodiments, the navigational aid may link to one or more items that are distinct from the pool of items generated by the item search application 115 in response to the search query. Such distinct item(s) may be determined at least in part from relative popularity of the distinct items compared with the pool of items or other items.

In various embodiments, the navigational aid may be associated with a node within a taxonomy described by taxonomy data 130. As a non-limiting example, a title associated with the node in the taxonomy data 130 may be rendered prominently within the navigational aid. Likewise, an image associated with the node in the taxonomy data 130 may also be rendered prominently within the navigational aid. The child nodes or other descendant nodes associated with the node in the taxonomy may be rendered as links within the navigational aid.

In some embodiments, the navigational aid may have a limited capacity for links. Therefore, the navigational aid may only display links associated with descendant nodes of the node in the taxonomy data 130 that meet a certain threshold of popularity or relevance from search profile data 133 and/or other data, such as, for example, click-throughs determined from page view data 127, sales determined from item sales data 124, search queries, etc. The measure of popularity may also determine the ordering of the links rendered within the navigational aid. As a non-limiting example, the more popular categories associated with specific child nodes may be represented by links nearer to the top of the navigational aid when they are more popular. Alternatively, or additionally, the more popular categories may have links rendered in a larger font, in bold text, and/or with another form of emphasis. Where the links are to specific items within a category, the items chosen may be, for example, popular items having a measure of popularity that is relatively greater than that of at least one other item associated with the category.

The item search application 115 generates at least one network page including a ranked list of at least a portion of the items. The ranked list includes the navigational aid when the relevance score associated with the navigational aid meets a threshold. The relevance score associated with the navigational aid may be calculated at least in part from the search query, the search context, search profile data 133, and/or other data. Additionally, the navigational aid may be included according to a content scheduling framework that determines the appropriate times for the navigational aid to be displayed to users according to content scheduling data 137. In one embodiment, the navigational aid is sequenced as second from the top of the ranked list. However, the navigational aid may be sequenced in other positions in other embodiments.

In various embodiments, the navigational aid is encoded for rendering by the browser 139 so that the navigational aid has at least a same prominence within the ranked list as an item. When the navigational aid is said to have a same prominence within the ranked list as an item, the navigational aid may have, as a non-limiting example, a title formatted similarly to titles of items within the ranked list. For example, the title of the navigational aid may be formatted using a same or similar font, font weight, underlining, capitalization, etc., as titles of items in the ranked list of items. When the items of the ranked list of items are each rendered with a numerical ranking identifier, the navigational aid may also be rendered with a numerical ranking identifier.

Further, the navigational aid may be sized similarly when rendered in a browser 139 as any one of the items within the ranked list of items. In one embodiment, when the items within the ranked list are delineated by a border and/or shading, the navigational aid may be similarly delineated by the same border and/or shading. In some embodiments, the navigational aid may have a greater prominence, with, for example, a larger size, special shading, a thicker border, and/or additional emphasizing features beyond a normal item. Additionally, where the navigational aid includes an image, the image may be encoded for rendering having at least a same prominence (e.g., size, position, etc.) as a plurality of item images included within the ranked list.

The item search application 115 then sends one or more network pages over the network 109 to the client 106. A browser 139 or other application executing on the client 106 then renders the one or more of the network pages for display to a user.

Figure 2:
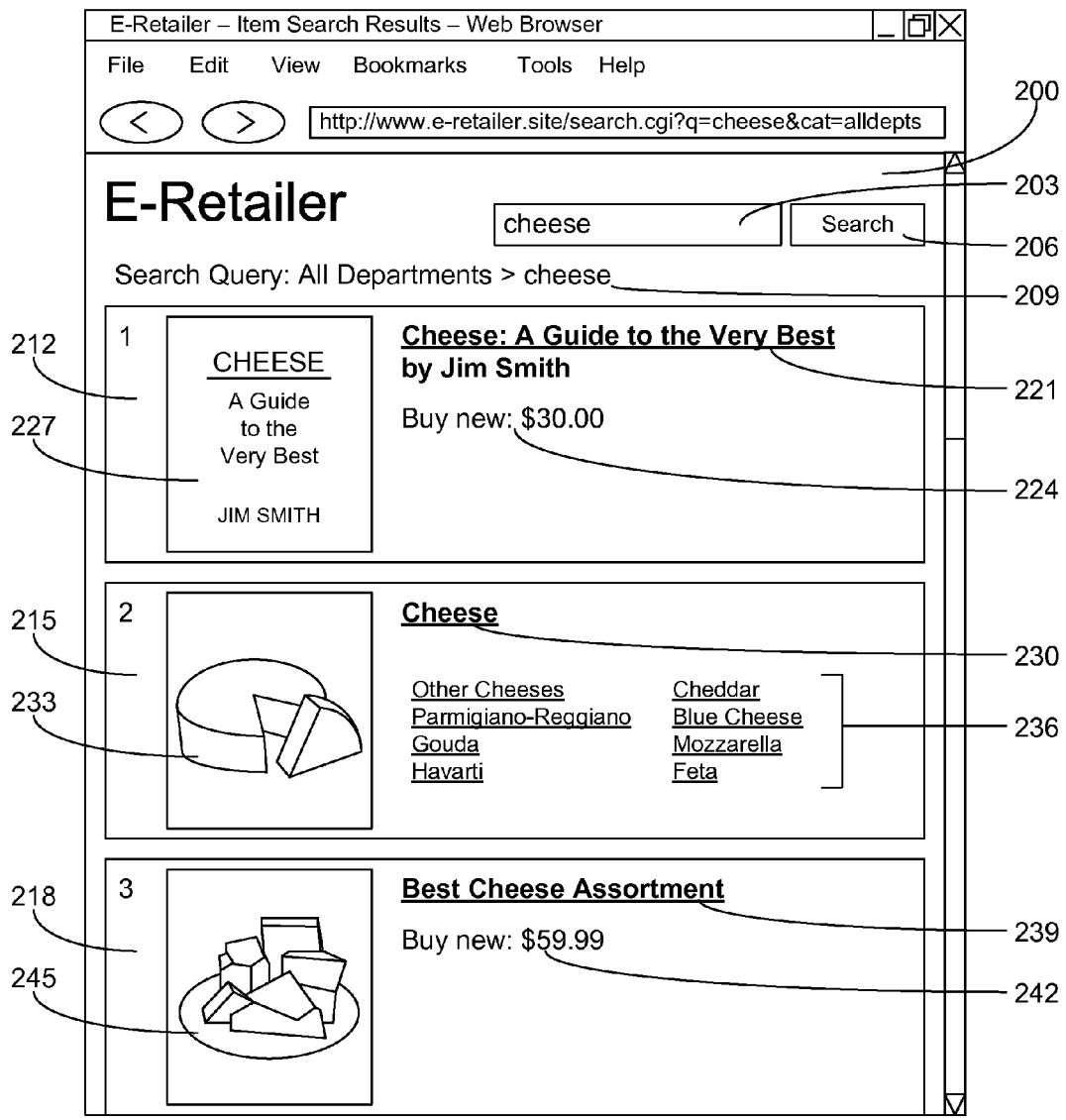
FIGS. 2 and 3 are drawings of examples of a user interface rendered by a client in the networked environment of FIG. 1 according to various embodiments of the present disclosure.

Referring next to FIG. 2, shown is a drawing of an example of a user interface 200 rendered by a browser 139 executing on a client 106 (FIG. 1) in the networked environment 100 (FIG. 1) according to various embodiments of the present disclosure. As shown, the user interface 200 represents a network page rendered by the browser 139 for display to a user. In this embodiment, an item search engine is deployed for an online retailer. However, it is understood that an item search engine may be deployed for many different purposes.

In this example, a user has entered the search term "cheese" within a search query entry field 203 and has executed an item search by clicking on the search button 206 on a previous network page. It is understood, however, that a search query may be entered in a variety of ways such as, for example, by clicking on a link, by depressing a key on a keyboard, and/or by other methods. In particular, the search button 206 may be optional, and a user may send a search query to the item search application 115 (FIG. 1) merely by hitting an enter key on a keyboard associated with the client 106. In various embodiments, the search query entry field 203 and search button 206 may be absent from the user interface 200.

As shown, the search term "cheese" is rendered within a label 209 immediately above item search results 212, 215, 218. The label 209, in addition to displaying the search term, also indicates the search context. In this case, the search context comprises "All Departments." As non-limiting examples, the search context may instead be books, digital downloads, electronics, foods, or any other category within a taxonomy in taxonomy data 130. In various embodiments, the search context may be selectable through a drop-down box or through other means. The label 209 is provided merely as an example and may not be present in various embodiments. In various embodiments, the item search results 212, 215, 218 may be rendered with more detail or less detail than that shown in FIG. 2. As a non-limiting example, in one embodiment, the item search results 212, 215, 218 may include images only.

Turning now to the item search results 212, 215, 218, the first item search result 212 has an item title 221 of "Cheese: A Guide to the Very Best." The item search result 212 describes a book available for purchase at an item price 224 of thirty dollars ($30). An accompanying item image 227 is also provided. In this example, if a user is not searching for a book, but is instead searching for cheese as a food, the user may be disappointed with the item search result 212. However, the item search application 115 may have selected the item search result 212 based upon the item title 221, which includes the keyword "Cheese" as the first word within the item title 221. Therefore, the item search result 212 may be determined as highly relevant to the search query "cheese" in the context of "All Departments." The search context in this example is "All Departments," which means that the user may have entered the search query on the home network page of the online retailer without specifying any particular item category or department.

In this example, the item search application 115 has inserted a navigational aid as item search result 215. The item search result 215 has a navigational aid title 230 of "Cheese." As a non-limiting example, the item search result 215 includes a navigational aid image 233 that represents a generic image of cheese. The item search result 215 also includes a plurality of links 236 to various network pages associated with categories, or nodes, within a taxonomy defined by the navigational aid title 230 of "Cheese." Though eight links appear within the plurality of links 236, the item search application 115 may be configured to include any number of links 236 within the item search result 215 comprising a navigational aid.

In various embodiments, the plurality of links 236 may comprise links for only a subset of nodes within the portion of the taxonomy associated with the navigational aid. In such cases, the item search application 115 may select the subset of child nodes according to various measures of popularity. For example, the item search application 115 may select child nodes based upon search profile data 133 (FIG. 1), page view data 127 (FIG. 1) (e.g., popularity in terms of number of times a page associated with an item has been visited), item sales data 124 (FIG. 1) (e.g., popularity in terms of number of items sold), and/or other data. In one embodiment, each child node may be given a relevance score determined with respect to the search query and/or search context. As non-limiting examples, the relevance score may depend on sales of items associated with that node, click-throughs to items associated with that node (where the click-throughs have been associated with a search query and/or search context), etc. A link to a category page 136 (FIG. 1) associated with the respective child node may be surfaced within the navigational aid when the relevance score meets a threshold.

Below the item search result 215 is the item search result 218. The item search result 218 is associated with an item having an item title 239 of "Best Cheese Assortment." The item has an item price 242 of fifty-nine dollars and ninety-nine cents ($59.99). The item search result 218 also includes an item image 245 that depicts the item described by the item title 239.

In user interface 200, the item search result 215 is given a same prominence as the item search result 212 and the item search result 218. Although configurations may slightly differ, the user at the client 106 is likely to perceive item search result 215 similarly to item search results 212, 218.

Moreover, the inclusion of the navigational aid within the item search result 215 provides an authoritative browsing experience for the user. To this end, a user who is searching for a type of cheese, which may be one of a majority of users searching for the search query "cheese," is presented with the plurality of links 236 that may be more helpful than specific items such as a book or a cheese assortment.

Figure 3:
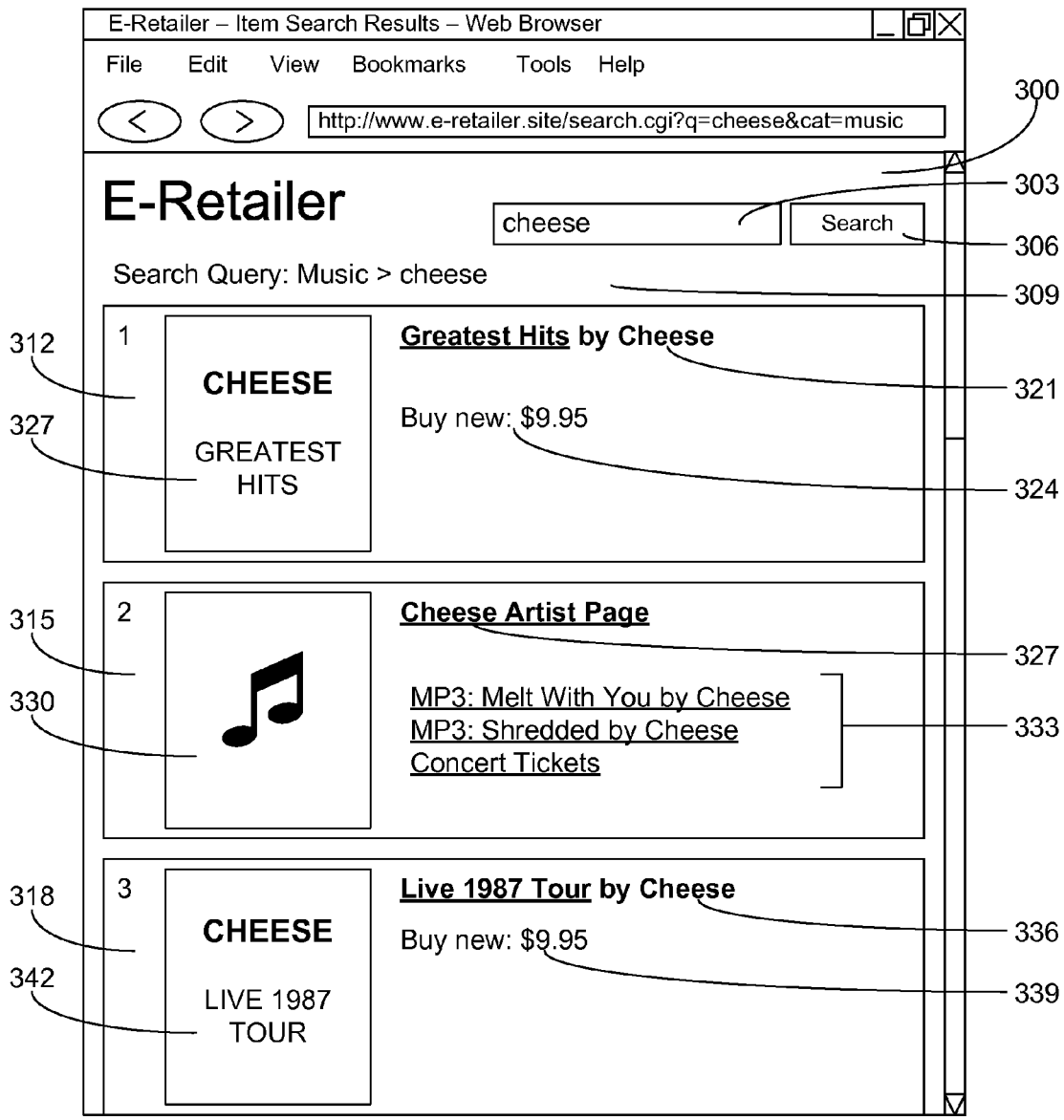

Turning now to FIG. 3, shown is a drawing of another example of a user interface 300 rendered by a browser 139 executing in a client 106 (FIG. 1) in the networked environment 100 (FIG. 1) according to various embodiments of the present disclosure. The user interface 300 also represents a network page that is being rendered by the browser 139, for example, in response to a search query. The search query input field 303 contains the same search query "cheese" as in FIG. 2. A search button 306 is also provided. The label 309, however, differs from the label 209 of FIG. 2 in that the search context is now "Music." The user may have navigated, for example, to a network page associated with the category of "Music" before entering the search query in a search query input field 303 on a previous network page.

Therefore, the item search results 312, 315, 318 differ from the item search results 212, 215, 218 of FIG. 2. Item search result 312 comprises a music album with an item title 321 of "Greatest Hits by Cheese." The item search result 312 also has an item price 324 and an item image 327. As a non-limiting example, if a user were searching for cheese as a food, the user may be disappointed with the item search result 312 because item search result 312 is a music album. However, item search result 312 may be deemed by the item search application 115 (FIG. 1) to be highly relevant to the search query of "cheese" because the search context comprises "Music."

Next, the item search result 315 comprises a navigational aid. The navigational aid, as described by navigational aid title 327, is associated with the musical artist "Cheese." The navigational aid title 327 may comprise a link to a category page 136 (FIG. 1) associated with the artist "Cheese." Also included in the item search result 315 is a navigational aid image 330 that may be relevant. The item search result 315 also includes a plurality of links 333 which, in this case, comprise links to purchase various items associated with the musical artist "Cheese." The various items in this example comprise music downloads and concert tickets. Such items may be selected based upon popularity and/or other factors as determined through item sales data 124 (FIG. 1), page view data 127 (FIG. 1), and/or other data. In various embodiments, as least one of the items in the plurality of links 333 is distinct from the pool of items generated by the item search application 115 in response to the search query in order to produce the ranked list.

The item search result 318 is another music album as described by the item title 336 of "Live 1987 Tour by Cheese." The item search result 318 has an item price 339 and an item image 342. In this example, the item search result 312 may be more relevant than the item search result 318 (and therefore listed nearer the top of the list of item search results 312, 315, 318) because the item associated with the item search result 312 may be more popular than the item associated with the item 318. It is understood, however, that ranking of the item search results 312, 318 may be performed according to a variety of other functions. As with FIG. 2, the item search result 315 representing a navigational aid is represented with the same prominence within the list of search results as the item search result 312 and the item search result 318. In other embodiments, the item search result 315 may be given a greater prominence than the item search results 312, 318.

Figure 4:
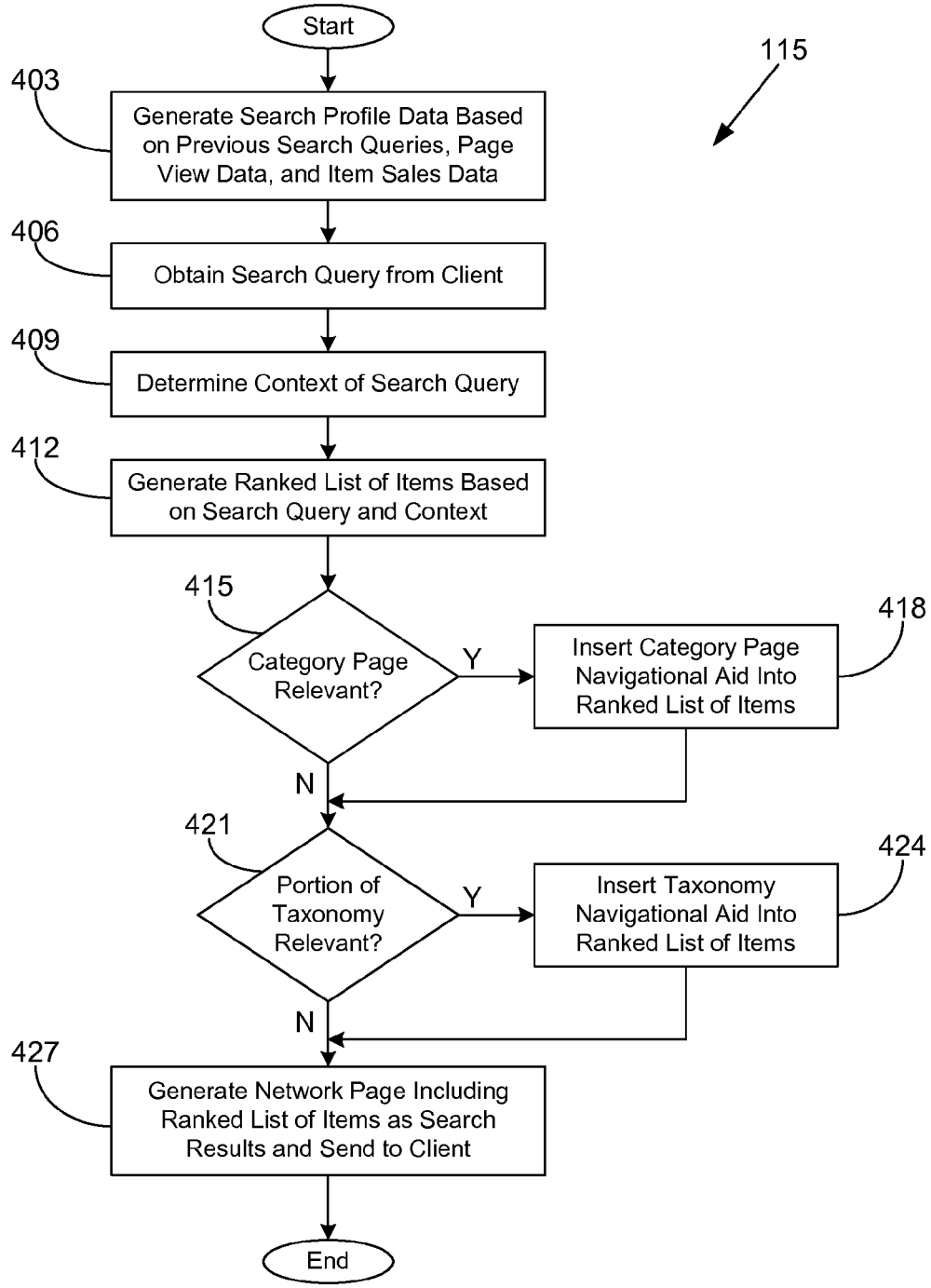
FIG. 4 is a flowchart illustrating one example of functionality implemented as portions of an item search application executed in a computing resource in the networked environment of FIG. 1 according to various embodiments of the present disclosure.

Referring next to FIG. 4, shown is a flowchart that provides one example of the operation of a portion of the item search application 115 according to various embodiments. It is understood that the flowchart of FIG. 4 provides merely an example of the many different types of functional arrangements that may be employed to implement the operation of the portion of the item search application 115 as described herein. As an alternative, the flowchart of FIG. 4 may be viewed as depicting an example of steps of a method implemented in the computing resource 103 (FIG. 1) according to one or more embodiments.

Beginning with box 403, the item search application 115 generates search profile data 133 (FIG. 1) based on previous search queries, page view data 127 (FIG. 1), item sales data 124 (FIG. 1), and/or other data. In various embodiments, the task of box 403 may be performed by the search profiling service 118 (FIG. 1) executed as an application separate from the item search application 115 on the computing resource 103. Then, in box 406, the item search application 115 obtains a search query from a client 106 (FIG. 1) over the network 109 (FIG. 1). For example, the search query may be entered in a text form within a browser 139 (FIG. 1) executing on the client 106 or by some other method. As a non-limiting example, the search query may be transmitted from the client 106 to the item search application 115 by way of an HTTP GET, POST, PUT, and/or other request.

In box 409, the item search application 115 next determines the context of a search query. The context of the search query may be a parameter explicitly provided by the client 106, or it may be determined by the item search application 115 based upon data stored, for example, within the data store 112 (FIG. 1) and associated with the client 106.

Next, in box 412, the item search application 115 generates a ranked list of items based at least in part on the search query and the search context. The items comprising the ranked list of items may be selected based at least in part on the relevance of the items to the search query and the search context. As a non-limiting example, the items may be relevant when keywords making up the search query match text associated with each of the items in item data 121 (FIG. 1).

In box 415, the item search application 115 determines whether a category in category pages 136 (FIG. 1) is relevant to the search query and the search context. A category page 136, or the navigational aid associated with the category page 136, may be said to be relevant when a relevance score associated with the category page 136 meets a threshold. The relevance score may be calculated at least in part from the search query, search context, the search profile data 133, and/or other data. If the item search application 115 determines in box 415 that the category page 136 is relevant, the item search application 115 proceeds to box 418 and inserts the category page navigational aid into the ranked list of items. In one embodiment, the navigational aid may be inserted as second in the sequence in the ranked list of items. Thereafter, the item search application 115 proceeds to box 421. If the item search application 115 determines in box 415 that no category page 136 is relevant to the search query and the search context, the item search application 115 also proceeds to box 421.

In box 421, the item search application 115 determines whether a portion of a taxonomy in taxonomy data 130 (FIG. 1) is relevant to the search query and the search context. In one embodiment, a portion of a taxonomy may be represented by a node associated with a category of items. If the item search application 115 determines in box 421 that a portion of a taxonomy data 130 is relevant, the item search application 115 proceeds to box 424 and inserts a navigational aid based upon a node within the taxonomy data 130 into the ranked list of items. As a non-limiting example, the navigational aid may be inserted into the ranked list of items as second in the sequence or at some other ranking. Thereafter, the item search application 115 proceeds to box 427. It is understood that, in various embodiments, multiple navigational aids as described above may be inserted into the ranked list of items. Specifically, in other embodiments, one or more category page navigational aids and one or more taxonomy navigational aids may be inserted into the same ranked list of items.

If, in box 421, the item search application 115 determines that no portion of a taxonomy is relevant, the item search application 115 also proceeds to box 427. In box 427, the item search application 115 generates one or more network pages including at least a portion of the ranked list of items as search results. It may be said that item search application 115 encodes the network page for rendering by the browser 139. Thereafter, the item search application 115 sends the one or more network pages to the client 106 by way of the network 109. The item search application 115 then ends.

Figure 5:
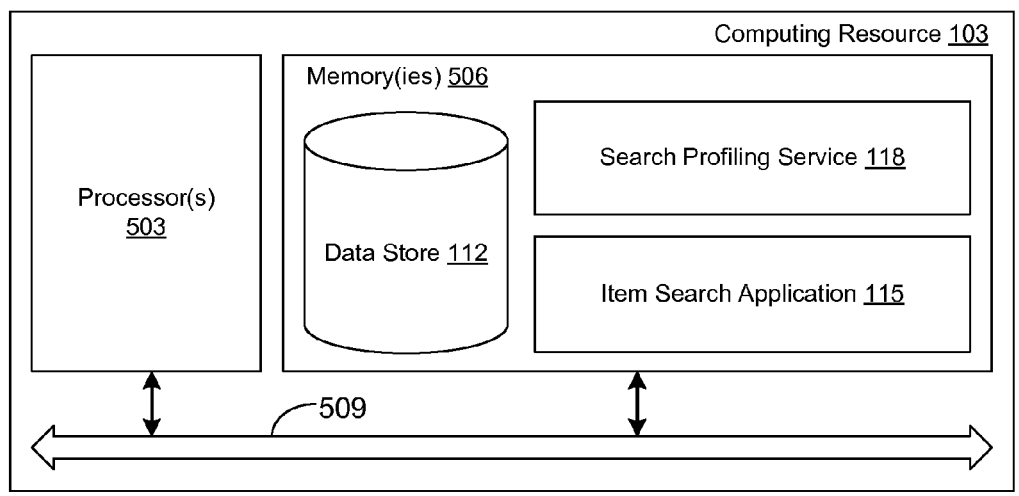
FIG. 5 is a schematic block diagram that provides one example illustration of a computing resource employed in the networked environment of FIG. 1 according to various embodiments of the present disclosure.

With reference to FIG. 5, shown is a schematic block diagram of the computing resource 103 (FIG. 1) according to an embodiment of the present disclosure. The computing resource 103 includes at least one processor circuit, for example, having a processor 503 and a memory 506, both of which are coupled to a local interface 509. To this end, the computing resource 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the item search application 115, the search profiling service 118, and potentially other applications. Also stored in the memory 506 may be a data store 112 and other data. In addition, an operating system may be stored in the memory 506 and executable by the processor 503.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network 109 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the item search application 115, the search profiling service 118, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 4 shows the functionality and operation of an implementation of portions of the item search application 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the item search application 115, the search profiling service 118, that comprises software or code can be embodied in any computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium storing a program executable in a computing resource, the program comprising:
    code that generates search profile data from information including a plurality of previous search queries, page view data, and product sales data;
    code that inputs a search query from a client;
    code that generates a pool of products in response to the search query and a search context associated with the search query;
    code that provides a navigational aid corresponding to a category associated with the search query, the navigational aid linking to at least one category network page associated with the category, the navigational aid further linking to at least one product distinct from the pool of products;
    code that generates at least one network page including a ranked list of at least a portion of the products, the ranked list including the navigational aid when a relevance score associated with the navigational aid meets a threshold, the relevance score calculated at least in part from the search query, the search context, and the search profile data, the navigational aid having at least a same prominence within the ranked list as a product; and
    code that sends the at least one network page to the client.

2. The non-transitory computer-readable medium of claim 1, wherein the at least one product distinct from the pool of products is determined at least in part from relative popularity of the at least one product.

3. The non-transitory computer-readable medium of claim 1, wherein the category network page includes static content relating to the category.

4. The non-transitory computer-readable medium of claim 1, wherein the category network page includes a list of a plurality of products associated with the category, wherein at least one of the plurality of products is distinct from the pool of products.

5. A method, comprising the steps of:
    generating, in a computing resource, a pool of items in response to a search query and a search context;
    generating, in the computing resource, a search profile data from information comprising at least page view data;
    encoding for rendering by a client at least one network page including a ranked list of at least a portion of the items, the ranked list including a navigational aid when a relevance score associated with the navigational aid meets a threshold, the relevance score being relative to respective relevance scores associated with the items in the ranked list, the navigational aid having at least a same prominence within the ranked list as an item; and wherein the relevance score is calculated at least in part from the search query, the search context, and the search profile data.

6. The method of claim 5, wherein the search query is obtained from the client.

7. The method of claim 5, wherein the search context is a default search context.

8. The method of claim 5, wherein the search context corresponds to a node within a taxonomy.

9. The method of claim 5, wherein the navigational aid is sequenced as second from the top of the ranked list.

10. The method of claim 5, wherein the information further comprises a plurality of previous search queries.

11. The method of claim 5, wherein the information further comprises item sales data.

12. The method of claim 5, wherein the navigational aid includes at least one image, the at least one image having at least a same prominence as a plurality of item images included within the ranked list.

13. The method of claim 5, wherein the navigational aid corresponds to a node within a taxonomy of items, the navigational aid linking to a plurality of category network pages, each of the category network pages corresponding to a descendent node of the node in the taxonomy, the descendant nodes selected according to at least search profile data.

14. The method of claim 13, wherein each of the category network pages includes a list of at least a portion of a plurality of items associated with the respective descendent node.

15. The method of claim 13, wherein the navigational aid links to a category network page corresponding to the node, the category network page including a list of at least a portion of a plurality of items associated with the node.

16. The method of claim 5, wherein the navigational aid corresponds to a network page associated with the search query, the network page being related to a customer service function.

17. The method of claim 5, wherein the navigational aid corresponds to a category associated with the search query, the navigational aid linking to at least one category network page associated with the category.

18. The method of claim 17, wherein the navigational aid links to a popular item associated with the category, the popular item having a measure of popularity relatively greater than that of at least one other item associated with the category.

19. The method of claim 18, wherein the navigational aid links to a network page that facilitates ordering of the popular item.

20. The method of claim 18, wherein the popular item is distinct from the pool of items.

21. A system, comprising:
a computing resource; and
an item search application executable in the computing resource, the item search application comprising:
  logic that generates a pool of search results in response to at least one search term and a search context, each one of the search results corresponding to a distinct item;
  logic that generates a navigational aid corresponding to a node within a taxonomy of items, the navigational aid linking to a plurality of category network pages, each of the category network pages corresponding to a descendent node of the node in the taxonomy, the descendant nodes selected according to at least historical relevance data; and
  logic that produces at least one network page including a ranked list of at least a portion of the search results, the ranked list including the navigational aid when a relevance score associated with the navigational aid meets a threshold, the navigational aid having at least a same prominence within the ranked list as a search result.

22. The system of claim 21, wherein the relevance score is calculated at least in part from the at least one search term, the search context, and the historical relevance data.

23. The system of claim 21, wherein each of the category network pages includes a list of at least a portion of a plurality of items associated with the respective descendent node.

24. The system of claim 21, wherein the items are buyable products.

25. The system of claim 21, further comprising a search profiling service executable in the computing resource, the search profiling service comprising:
  logic that generates the historical relevance data from information including an association between the at least one search term and item popularity data.

26. The system of claim 25, wherein the search profiling service further comprises logic that generates the item popularity data from information including page view data and item sales data.

* * * * *